US012092320B2

(12) United States Patent
Malinskiy et al.

(10) Patent No.: US 12,092,320 B2
(45) Date of Patent: Sep. 17, 2024

(54) LIGHT SOURCE CONVERTER

(71) Applicant: Lazurite Holdings LLC, Cleveland, OH (US)

(72) Inventors: Ilya Malinskiy, Cleveland Heights, OH (US); Eugene Malinskiy, Mayfield Village, OH (US); Daniel Dudley, Cleveland, OH (US); Laimis Belzinskas, Kirtland, OH (US); Howard Fein, Richmond Heights, OH (US); Jacquelyn Aguilera, Cleveland, OH (US)

(73) Assignee: Lazurite Holdings LLC, Cleveland Heights, OH (US)

( * ) Notice: Subject to any disclaimer, the term of this patent is extended or adjusted under 35 U.S.C. 154(b) by 59 days.

(21) Appl. No.: 17/603,914

(22) PCT Filed: Apr. 16, 2020

(86) PCT No.: PCT/US2020/028505
§ 371 (c)(1),
(2) Date: Oct. 14, 2021

(87) PCT Pub. No.: WO2020/214810
PCT Pub. Date: Oct. 22, 2020

(65) Prior Publication Data

US 2022/0235916 A1 Jul. 28, 2022

Related U.S. Application Data

(60) Provisional application No. 62/834,677, filed on Apr. 16, 2019.

(51) Int. Cl.
*F21V 9/40* (2018.01)

(52) U.S. Cl.
CPC .................................... *F21V 9/40* (2018.02)

(58) Field of Classification Search
CPC ..... F21V 9/40; F21V 9/32; F21V 9/38; G02B 6/0061; G02B 6/0041; H01L 33/508
See application file for complete search history.

(56) References Cited

U.S. PATENT DOCUMENTS 9,142,732 B2 * 9/2015 Luo ........................ H05B 33/10
2006/0226759 A1 * 10/2006 Masuda .................... H01J 1/63
313/486

(Continued)

FOREIGN PATENT DOCUMENTS

CN 107924976 A 1/2021
JP 2018 106928 A 7/2018

(Continued)

OTHER PUBLICATIONS

Search Report, dated Jan. 5, 2023, for corresponding European Patent Application No. 20790527.4, 10 pages.

(Continued)

*Primary Examiner* — Zheng Song
(74) *Attorney, Agent, or Firm* — Morgan, Lewis & Bockius LLP

(57) ABSTRACT

A light source converter including a non-homogeneous conversion core optically coupled to a light source. The conversion core having a transmitting medium comprised of a plurality of layers, a proximal end, a distal end, and a length extending between the proximal end and the distal end. The light source converter further including a plurality of phosphor particles volumetrically suspended in each of the plurality of layers of the transmitting medium. A density of the plurality of phosphor particles in one of the plurality of layers proximate the proximal end of the conversion core differs from a density of the plurality of phosphor particles in another of the plurality of layers proximate the distal end of the transmitting medium.

25 Claims, 15 Drawing Sheets

(56) References Cited

U.S. PATENT DOCUMENTS

2009/0034230 A1* 2/2009 Lim .................... G02B 6/0061 362/84
2009/0224177 A1* 9/2009 Kinomoto .......... C09K 11/7789 250/226
2011/0069490 A1 3/2011 Liu
2012/0051075 A1* 3/2012 Harada ................. H01L 33/508 362/510
2013/0272029 A1* 10/2013 Wu ........................... F21V 9/38 362/613
2014/0022779 A1* 1/2014 Su ......................... H01L 33/504 362/231
2015/0153010 A1* 6/2015 Okuyama ............. F21S 41/285 252/301.4 F
2016/0027971 A1* 1/2016 Anc ..................... C09K 11/025 252/301.36
2017/0030532 A1* 2/2017 Ryohwa ................ H01L 33/501
2017/0153535 A1* 6/2017 Lin ...................... G03B 21/208
2019/0101814 A1 4/2019 Yamaguchi et al.
2021/0080815 A1* 3/2021 Yamaguchi ............. H01L 33/50

FOREIGN PATENT DOCUMENTS

WO 20140080705 A1 5/2014
WO 2017/209152 A1 12/2017

OTHER PUBLICATIONS

International Search Report and Written Opinion dated Jul. 21, 2020 for International Patent Application No. PCT/US2020/028505, 8 pages.
Office Action issued in corresponding Chinese Patent Application No. 202080023171.X dated Feb. 16, 2023, 25 pages with English translation.

* cited by examiner

LIGHT SOURCE CONVERTER

CROSS REFERENCE TO RELATED APPLICATIONS

This application is a U.S. National Phase of International Application No. PCT/US2020/028505 filed on Apr. 16, 2020, which claims the benefit of U.S. Provisional Patent Application No. 62/834,677 filed Apr. 16, 2019 entitled “Light Source Converter”, each of which is incorporated by reference herein in its entirety.

FIELD OF THE INVENTION

The present invention generally relates to a light source converter for use with an optical device and, more particularly, to a light source converter for use with an optical device having a volumetric phosphor core.

BACKGROUND OF THE INVENTION

Since the invention of the first solid state lighting (SSL) devices in the 1920’s there has been a concentrated push towards their use as alternatives to contemporary light sources. In the 1960’s the first bright SSL devices were invented and their use as a source of light in the industrial and consumer fields climbed sharply. The next major goal of SSL device research was to discover a new way to produce white light, and this was mainly accomplished by the mixing of narrow band red, blue, and green (RGB) light sources. This kind of mixing poses a multitude of issues compared to broad spectrum ‘white’ light that is expected, such as reproduction of color accuracy and temperature.

The next stage in the evolution of SSL devices came about in the 1990s when bright blue light emitting diodes (LEDs) were invented and subsequently mated with a thin layer of phosphor coating. This layer of phosphor coating may interact with the blue light emitted from the diode and subsequently convert the light into a broad spectrum emission with a peak at a longer wavelength than that of the incident blue light. The mixing of non-converted blue light and the converted light gives a much better reproduction of broad spectrum ‘white’ light than previous discrete RGB mixing methods.

Lasers emit light through optical amplification based on the stimulated emission of electromagnetic radiation. Lasers are generally distinguished over other light sources because of their spatial coherence. Spatial coherence is typically expressed through the output of a laser being a narrow beam, which is diffraction limited. Lasers also have temporal coherence, which allows them to emit light with a narrow spectrum and as a result, a single color of light. Lasers have long been used where light of the required spatial or temporal coherence may not be produced using simpler technologies.

Traditionally, the only way to make the phosphor conversion function properly within an SSL device was to coat the light emitting source in a thin layer of phosphor material. Subsequent research showed that a large percentage of the incident blue light was reflecting off the phosphor coating and, therefore, not being converted, leading to a large loss of usable light and a reduced overall efficiency. A response to this was remote phosphor, a method in which the phosphor conversion material is offset from the light emitting source by a distance. By placing the conversion material a short distance away from the light emitting source, the possibility of errant reflections was decreased and a higher conversion efficiency was created from an otherwise identical SSL device. The remote phosphor was typically a lens or cap made from a transparent medium coated in a very thin layer of phosphor and positioned away from the light emitting source.

While remote phosphor is an improvement over older SSL devices, in which the light emitting source was directly covered in phosphor, having a thin layer of conversion material to work with may pose several issues. These issues may include a limitation on the amount of emitted light that can be converted before the phosphor is saturated, a direct correlation between the surface area of the emission source and the amount of phosphor that can be exposed, the concentration of temperature on a thin surface, and the overall efficiency of the conversion system.

Accordingly, there is a need for a light converter that can efficiently convert a large amount of emitted light to a different wavelength

BRIEF SUMMARY OF THE INVENTION

In one embodiment, there is a light source converter including a non-homogeneous conversion core optically coupled to a light source, the conversion core having a transmitting medium comprised of a plurality of layers, a proximal end, a distal end, and a length extending between the proximal end and the distal end. The light source converter further including a plurality of phosphor particles volumetrically suspended in each of the plurality of layers of the transmitting medium, a density of the plurality of phosphor particles in one of the plurality of layers proximate the proximal end of the conversion core differing from a density of the plurality of phosphor particles in another of the plurality of layers proximate the distal end of the transmitting medium.

In one embodiment, the plurality of phosphor particles includes two or more phosphor particle percentages, compositions and/or chemistries. The two or more phosphor particle percentages across the length of the transmitting medium may be from approximately 0% to approximately 100% or from approximately 0.1% to approximately 25%.

In one embodiment, the plurality of phosphor particles includes two or more phosphor types. One or more of a percentage, chemistry, and composition of the two or more phosphor particles may be configured to continuously broaden an absorption band of light from the light source.

In one embodiment, the volumetric suspension of the plurality of phosphor particles forms a gradient phosphor core. The gradient phosphor core may be a continuous or discontinuous gradient phosphor core.

In one embodiment, a thickness of each of the plurality of layers is approximately 30 microns to approximately 30 microns less than the total length of the transmitting medium. A thickness of each of the plurality of layers may be approximately from 0.01 mm to approximately 25 mm.

In one embodiment, the density of the plurality of phosphor particles increases or decreases from the proximal end to the distal end.

In one embodiment, the transmitting medium is comprised of a semi-transparent material configured to allow certain visible wavelengths of light to pass unimpeded through the transmitting medium. Transmitting medium may be comprised of polypropylene, glass, acrylic, ceramics, polycarbonate, optical polymers, polyesters, polystyrenes, polyethylenes, polyurethanes, olefins, copolymers, gels, hydrogels, glassy, crystalline, and/or supercooled liquids.

In one embodiment, the transmitting medium is comprised of polypropylene, glass, acrylic, ceramics, and/or polycarbonate.

In one embodiment, the conversion core is configured to modify optical properties of light from the light source by diffusion, absorption, and/or redirecting specific wavelengths of light.

In one embodiment, each of the plurality of phosphor particles has a generally predetermined position in the plurality of layers. The plurality of phosphor particles may be generally equally spaced from one another across each cross section along the length of the conversion core, wherein each cross-section is taken normal to the length of the conversion core.

In one embodiment, each of the plurality of layers is comprised of multiple sublayers each having the same phosphor particle density and/or phosphor particle chemistry within a sublayer. Each of the plurality of layers may have the same phosphor particle density and/or phosphor particle chemistry across a length of the each of the plurality of layers.

In one embodiment, the light source is a laser. The light source may output a first spectrum of radiation and the conversion core may output a second spectrum of radiation different than the first spectrum.

In one embodiment, at least two layers of the plurality of layers differ in phosphor particle percentage, phosphor particle density, phosphor particle composition and/or phosphor particle chemistry.

In one embodiment, the volumetric suspension of the plurality of phosphor particles is a discontinuous volumetric suspension including a non-linear, monotonic or polytonic suspension.

Another embodiment of the present invention provides for an optical device including a laser light source. The optical device may include a non-homogeneous conversion core optically coupled to the laser light source, the conversion core having a proximal end, a distal end, a length extending between the proximal end and the distal end, and a transmitting medium comprised of a transparent or translucent material and a plurality of layers. The optical device may further include a plurality of phosphor particles volumetrically suspended in each of the plurality of layers of the transmitting medium, each layer further arranged in a sequence of sublayers, each of the phosphor particles having a generally predetermined position in the sequence of sublayers and thicker layers or groups of layers, a density of the plurality of phosphor particles proximate the proximal end of the conversion core differing from a density of the plurality of phosphor particles proximate the distal end of the conversion core to form a gradient phosphor core. The gradient phosphor core may be configured to continuously broaden a spectrum of light absorption from the laser light source along the length of the conversion core.

BRIEF DESCRIPTION OF THE SEVERAL VIEWS OF THE DRAWINGS

The foregoing summary, as well as the following detailed description of embodiments of the light source converter, will be better understood when read in conjunction with the appended drawings of an exemplary embodiment. It should be understood, however, that the invention is not limited to the precise arrangements and instrumentalities shown.

DETAILED DESCRIPTION OF THE EXEMPLARY EMBODIMENTS OF THE INVENTION

Figure 1:
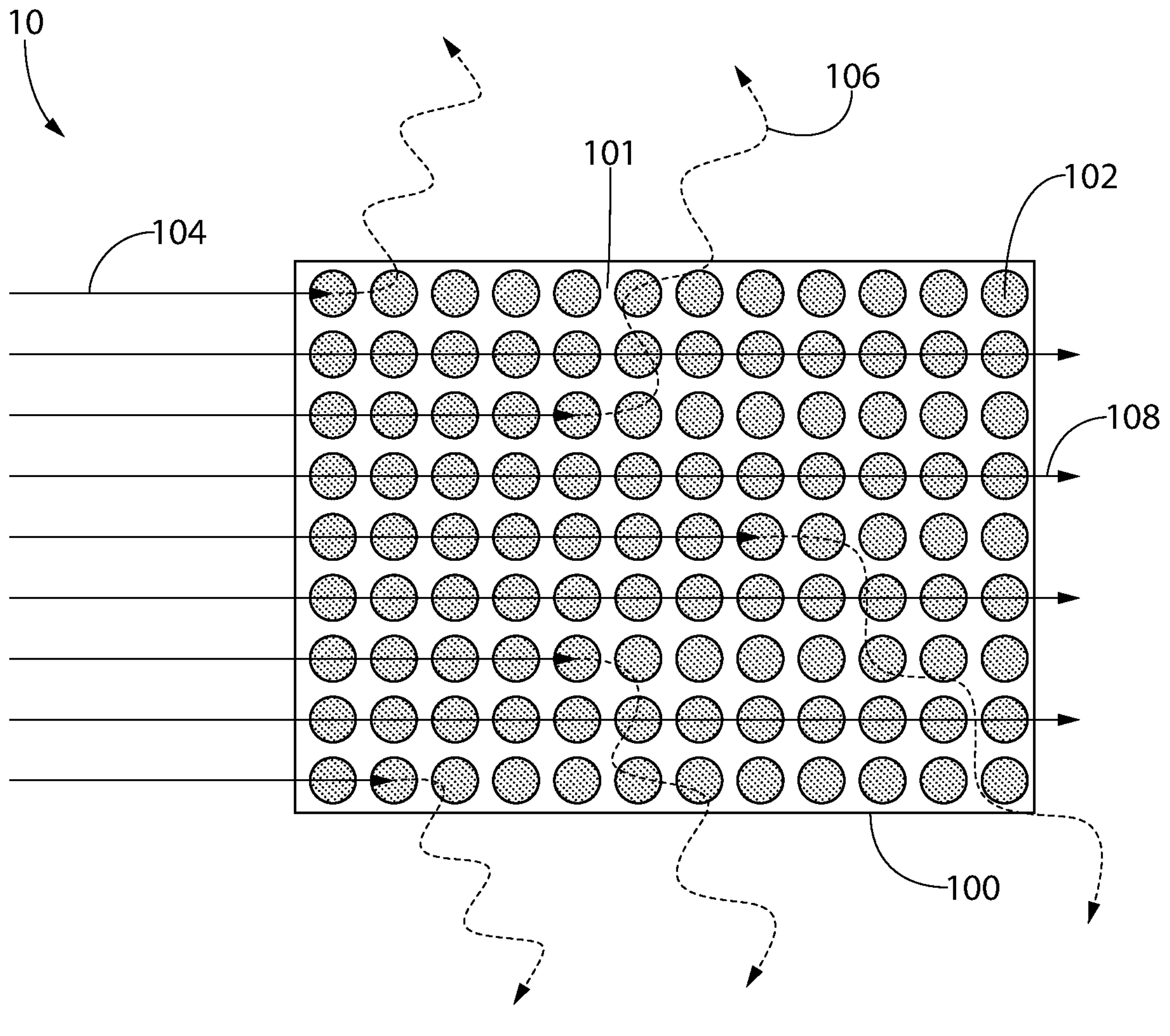
FIG. 1 (PRIOR ART)
FIG. 1 is a schematic diagram of a prior art light source converter having a homogeneous volumetric phosphor conversion core.

Embodiments of the present invention may provide a method for volumetrically disposing phosphor compounds in a carrying medium wherein the percent of phosphor by volume may vary. The benefits of a volumetric gradient phosphor core over the current system of using a thin, uniformly distributed, coating on a remote surface are numerous and described herein. A benefit of a volumetric phosphor core may be that a much larger volume of a phosphor compound may be exposed to incident light without the use of specialized optics. A larger amount of phosphor being available for use in the conversion process, without increasing the surface area exposed to incident light, may greatly increase the efficiency of the system, while allowing for a comparatively smaller overall size for the light source for the subsequent light output.

An advantage arises from disposing the phosphor compound in a gradient distribution within the carrying medium as compared to current thin coating methods. Using a gradient distribution may allow for more precise control of the characteristics of the converted output light. The precise control arising from the gradient distribution may assist with aspects of the output light such as, but is not limited to, better color reproduction, a more controllable color temperature, a more controllable peak wavelength, better temperature handling, better mixing of narrow band incident light and broad band emitted light, a more temperature stable system, and a more efficient conversion process.

Embodiments of the invention may provide either a step-wise (discontinuous) gradient or a smooth (continuous) gradient distribution of phosphor material within the carrying medium. Such a distribution may be, but is not limited to, linear, non-linear, monotonic, polytonic, etc. The gradient distribution may also constitute changes in the thickness of distribution layers that range, for example, but not limited to, from 30 microns to 30 microns less than the length of the whole core. This type of gradient may be achieved by using a manufacturing process that creates layers. Each layer may be comprised of multiple sublayers. Each sublayer may be comprised of similar or identical phosphor particle density and composition. The manufacturing process may create and combine the layers through a variety of methods, such as but not limited to, lamination, hydrothermal synthesis, sintering, fusing, deposition, sol gel process, gel combustion, diffusion bonding, chemical precipitation, coprecipitation, solid-state/wet-chemical synthesis, and/or adhesives.

The manufacturing process may also allow for the intentional use of a plurality of phosphor compounds in the same phosphor core, a plurality of phosphor particle sizes, as well as distributing the different phosphor compounds in different concentrations. This can lead to even more precise control of the converted output light. The manufacturing process also involves intentionally choosing the percentage, size, and type of phosphor that is to be suspended in the transmitting medium to ensure that the output light fits the requirements for each use case. The manufacturing process also allows for the intentional arrangement of a sequence of thin sublayers of the carrying medium, now mixed with phosphor particles at a pre-determined percentage, into a thicker layer or group of layers leading to a more precise light output. The individual sublayers may have similar or identical phosphor particle density, size, and/or composition between the sublayers within the individual layers. Having similar phosphor particle density and composition in the sublayers within each layer may allow for specific control of phosphor particle arrangement in the respective layers and the transmitting medium overall. At a minimum, the thickness of a sublayer may be the diameter of one phosphor particle. The thickness of a sublayer is dependent on the light conversion and modulation properties required per use case. Each layer may be comprised of tens, hundreds, thousands, or millions of sublayers. Throughout the process, an optimization workflow is established which continuously improves the efficiency and control of the phosphor particle suspension, based on rigorously tested observations.

An embodiment of the invention may be a non-homogeneous gradient volumetric phosphor conversion core wherein the lowest concentration of phosphor may be located on the side where the incident light enters the conversion core, and the highest concentration of phosphor may be located distal from the side where the incident light enters the conversion core. Another embodiment of the invention may be a non-homogeneous gradient volumetric phosphor conversion core wherein the lowest and highest concentrations of phosphor may be located within the conversion core but are not necessarily oriented from lowest to highest concentration, relative to the incident light. Such an embodiment of the invention may be a non-homogeneous gradient volumetric phosphor conversion core wherein the lowest and highest concentrations of phosphor may be located within the conversion core and the concentration of the phosphor may vary in a radial distribution from the center axis of the core. Such an embodiment, for example, could have the highest concentration at the center decreasing radially outwards in the core. Another such embodiment, for example, could have the lowest concentration at the center increasing radially outward.

The present invention may relate to an improved method of efficiently converting narrow band light into broad spectrum light of longer wavelength. For example, a narrow band blue light with a peak wavelength at 450 nm can be converted into a broad spectrum light that ranges from 450 nm to 750 nm. In a second example, a narrow band green light with a peak wavelength at 515 nm can be converted into a broad spectrum light that ranges from 900 nm to 3 microns. As is described below, in some embodiments, a gradient volumetric phosphor conversion core has been developed.

Referring to FIG. 1, there is shown a traditional approach for light conversion that is disclosed in the prior art. Light conversion system 10 may include conversion core 100 having transmitting medium 101 and a distribution of phosphor particles 102 distributed throughout the volume of transmitting medium 101. A light source (not shown) may be optically coupled to transmitting medium 101 and may be configured to emit light 104, wherein light 104 may enter and transmit through conversion core 100.

In one embodiment, the light source is a laser that is used for the conversion process and has an output wavelength of 450 nm, and an optical power output of 100 mW. In another embodiment, the light source is a laser that is used for the conversion process and has an output wavelength of 515 nm and an optical power output of 150 mW. In yet another embodiment, the light source is a laser that is used for the conversion process and has an output wavelength of 445 nm and an optical power output of 10 W. However, the laser source may have a wavelength appropriate to excite a specifically defined phosphor material and may be, for example, but not limited to, laser radiation with wavelengths between 200 nm and 450 nm, 400 nm and 750 mm, 450 nm and 900 nm, 800 nm and 1550 nm, and others.

In methods illustrated in FIG. 1, there may exist a homogeneous distribution of phosphor particles 102 throughout the volume of conversion core 100. Further, this homogeneous distribution of phosphor particles 102 may be arranged in a random and unintentional manner such that the beam of input light 104 may not be configured to interact with phosphor particles 102 to maximize light conversion. In one embodiment, the beam of input light 104 interacts with phosphor particle 102, resulting in converted light 106 being emitted. In another embodiment, light 104 does not interact with phosphor particle 102, resulting in unconverted light 108 being emitted. This random and unintentional arrangement of particles may also require the use of specialized optics to concentrate light into the transmitting medium. Conversion core 100 may also need to be positioned a short distance away from the light source to reduce the possibility of reflections.

Figure 2A:
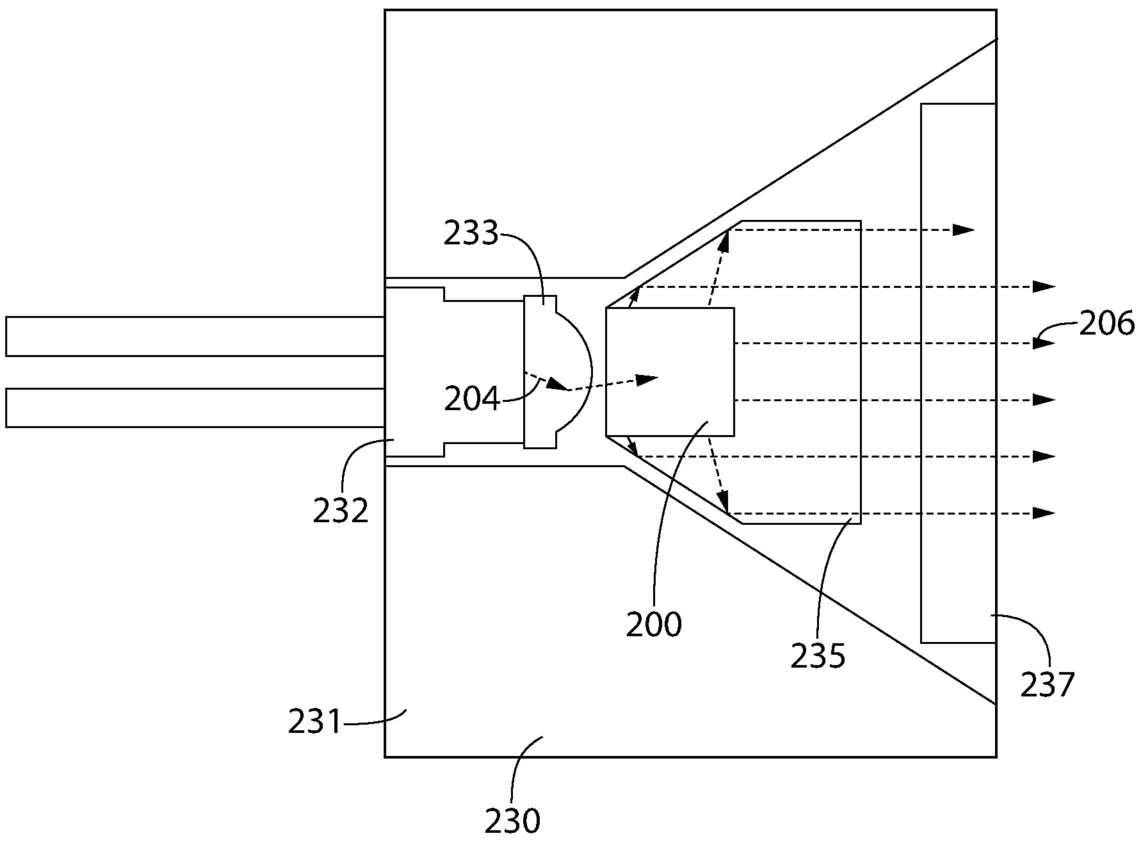
FIG. 2A is a schematic diagram of a light source having a light source converter, having a volumetric phosphor conversion core and a continuous density gradient in accordance with an exemplary embodiment of the present invention.
Figure 2B:
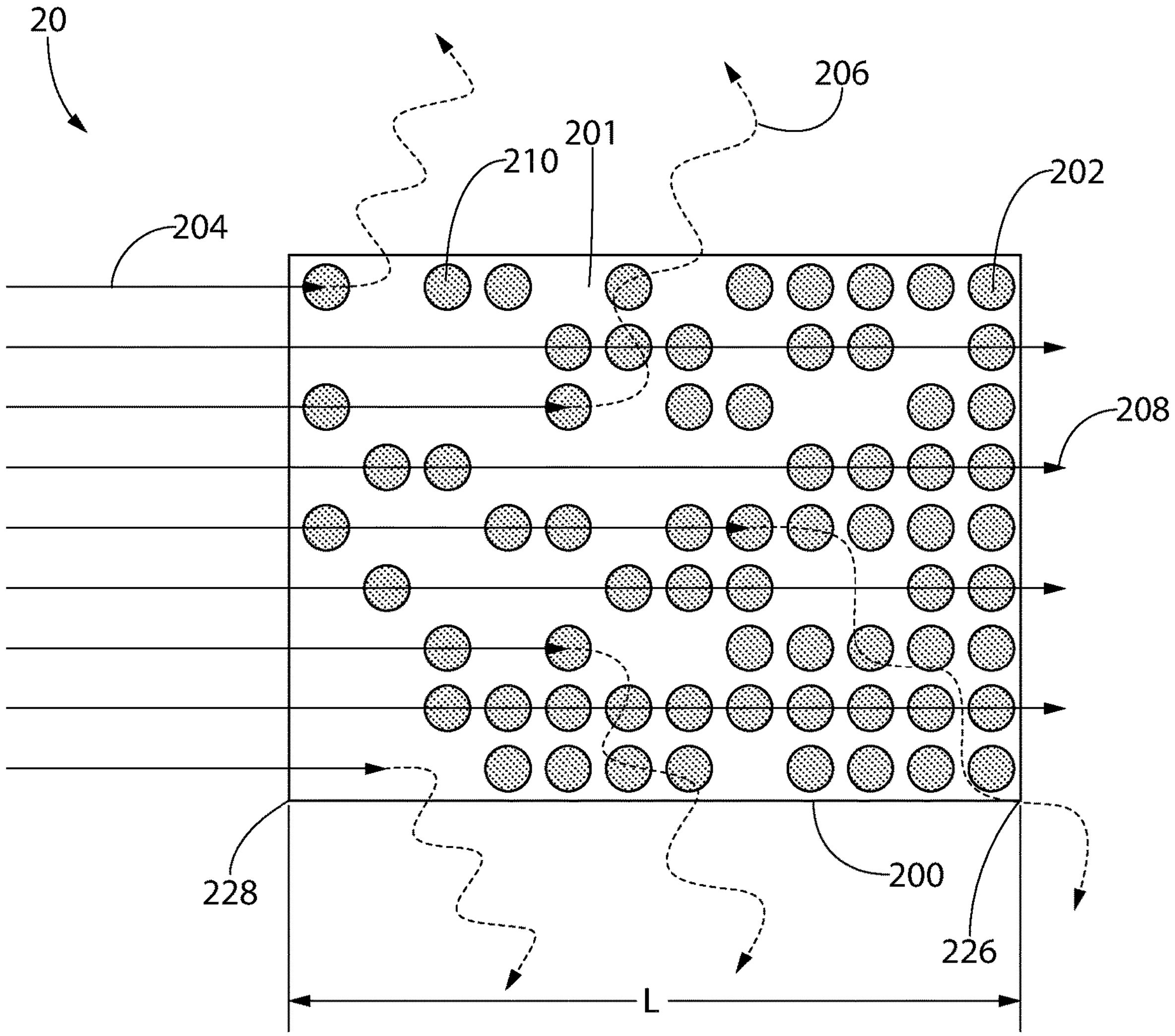
FIG. 2B is a schematic diagram of a light source converter, having a volumetric phosphor conversion core and a continuous density gradient in accordance with an exemplary embodiment of the present invention.

Referring to FIGS. 2A and 2B, there is shown a first exemplary embodiment of the present invention. In one embodiment, there is light conversion system 20 which includes conversion core 200 having transmitting medium 201 and a distribution of a plurality of phosphor particles 202 with a non-homogeneous volumetric suspension within conversion core 200. In one embodiment, the manufacturing process that suspends the plurality of phosphor particles 202 may require mixing of the plurality of phosphor particles 202 with a carrier material, such as polymethyl methacrylate (PMMA). Other carrier materials may be employed, such as other optical polymers, ceramics, polyesters, polystyrenes, polycarbonates, polyethylenes, polyurethanes, olefins, copolymers, gels, hydrogels, glassy, crystalline, supercooled liquids, and other similar materials, including those not specified but having similar properties and the ability to act as carriers for phosphor particles having the described characteristic. The carrier material may comprise transmitting medium 201 in which the plurality of phosphor particles 202 are suspended in. The resultant mixture of the carrier material and the plurality of phosphor particles 202 may be compressed and extruded into individual sublayers that are then compressed, glued, and/or bonded to form conversion core 200. The plurality of phosphor particles 202 and the carrier material, such as PMMA or ceramic material, may be varied and controlled to achieve a desired percentage of the plurality of phosphor particles 202 per thin sublayer or group of layers that is then additionally bonded with additional layers of PMMA or ceramic and phosphor particles 202 mixed together.

Referring to FIG. 2A, in some embodiments, conversion core 200 is optically coupled to light source 232, emitting light 204 which may have a first spectrum of radiation. Conversion core 200 may be used within device 230. Device 230 may be a wireless imaging device, such disclosed in U.S. Pat. No. 10,610,089, which is hereby incorporated by reference in its entirety. Device 230 may further include optical element 233, optical reflector 235, package body 231, and filter 237. Light source 232 of device 230 may output light 204 which interacts with conversion core 200, outputting converted light 206. Device 230 may include optical element 233, which may be disposed between light source 232 and conversion core 200. Optical element 233 may redirect light 204 to conversion core 200. Device 230 may include optical reflector 235 and filter, which may be configured to further condition converted light 206 converted by conversion core 200. Light source 232 may be positioned anywhere, as long as light 204, which interacts with the plurality of phosphor particles 202, is perpendicular to the layers of conversion core 200.

Referring to FIG. 2B, conversion core 200 may have distal end 226, proximal end 228, and length L extending between proximal end 228 and distal end 226. The dimensions of conversion core 200 may be in the millimeter to meter range. In some embodiments, conversion core 200 has dimensions in millimeters, centimeters, decimeters, or meters. For example, conversion core 200 may have length L of 10 mm, a width of 5 mm, and a height of 5 mm. Conversion core 200 may have length L between 1 mm and 50 mm, 5 mm and 40 mm, 10 mm and 30 mm, 20 mm and 25 mm. Conversion core 200 may have a width between 1 mm and 50 mm, 5 mm and 40 mm, 10 mm and 30 mm, or 20 mm and 25 mm. Conversion core 200 may have a height between 1 mm and 50 mm, 5 mm and 40 mm, 10 mm and 30 mm, or 20 mm and 25 mm. In one embodiment, conversion core 200 is a cylinder with length L of 10 mm and a diameter of 5 mm. In other examples, conversion core 200 has length L greater than 1 m, such as an elongated lighting tube.

Light 204 may enter conversion core 200 from proximal end 228. In one embodiment, light 204 interacts with phosphor particles 202, which converts light 204 to converted light 206 resulting in converted light 206 being emitted from conversion core 200. Converted light 206 may have a second spectrum of radiation different than the first spectrum of radiation of light 204. Converted light 206 being emitted from the conversion core 200 may be shown as curved to represent a different wavelength after an interaction. For example, light 204 may interact with the plurality of phosphor particles 202 thereby emitting converted light 206, which has a different wavelength than light 204. In another embodiment, light 204 continues through conversion core 200 without interacting with the plurality of phosphor particles 202, resulting in unconverted light 208 being emitted from conversion core 200. Unconverted light 208 may be light that does not interact with any of phosphor particles 202, thus results in unconverted light 208 have the same wavelength of light 204. In some embodiments, the wavelength of unconverted light 208 is the same as the wavelength of light 204.

Conversion core 200 may produce a mix of converted light 206 and unconverted light 208. In some embodiments, the distribution of phosphor particles 202 is volumetrically suspended in transmitting medium 201, which may be arranged in a sequence of sublayers. The plurality of phosphor particles 202 may be generally equally spaced from one another across each cross section taken along length L of conversion core 200. In one embodiment, the plurality of phosphor particles 202 are equally spaced from one another across each cross section taken along length L of conversion core 200. In some embodiments, the plurality of phosphor particles 202 may be generally evenly spaced from one another across each cross section taken along length L of conversion core 200, where evenly means the average spacing between the plurality of phosphor particles 202 is equal. In some embodiment, approximately 97%, 95%, 90%, 80%, 85% or 75% of the plurality of phosphor particles 202 may be evenly spaced apart from each other across each cross section along length L of conversion core 200. In other embodiments, the plurality of phosphor particles 202 are non-equally spaced from another across each cross section taken along length L of conversion core 200. For example, some of the plurality of phosphor particles 202 may clump or group within a layer or sublayer, resulting in subgroup of plurality of phosphor particles 202 being non-equally spaced. Approximately 97%, approximately 95%, approximately 90%, approximately 80%, approximately 85% or approximately 75% of the plurality of phosphor particles 202 may be equally spaced apart from each other across each cross section taken along length L of conversion core 200.

The sequence of sublayers may be intentionally arranged in layers or groups of layers, each having a distribution of phosphor particles 202 disposed within, and configured to continuously broaden the absorption of light 204 from the light source. In one embodiment, the sequence of sublayers may be intentionally arranged to continuously broaden the absorption of light 204 from the light source. The distribution of phosphor particles 202 suspended in transmitting medium 201 may be non-homogeneous, as shown by the smaller percentage of phosphor particles 202 on proximal end 228 compared to the larger percentage of phosphor particles 202 on distal end 226 of the transmitting medium 201. In some embodiments, conversion core 200 includes a continuous increase in the density of phosphor particles 202 from proximal end 228 to the density of phosphor particles 202 adjacent distal end 226. The rate of density increase may depend on the desired goal of the output lighting. For example, conversion core 200 may include different rates of density increase based on the desired brightness, color, and/or efficiency of the overall system. In one embodiment, the density, chemistry, size, composition and/or percentage of the phosphor particles 202 near distal end 226 of conversion core 200 may differ from the density, chemistry, composition, and/or percentage of phosphor particles 202 near proximal end 228 of conversion core 200.

The embodiment of FIGS. 2A and 2B, as described herein, may be comparable to those of FIGS. 3-7. The light conversion process may occur by utilizing the process of fluorescence and Stokes shift in the gradient phosphor particles in the conversion core. The volumetric suspension of phosphor particles 202 may form a gradient phosphor core in conversion core 200. In one embodiment, the specific and intentional volumetric suspension of phosphor particles 202 may lead to more phosphor particles 202 interacting with incoming light 204 and participating in light conversion. Each layer of conversion core 200 may be arranged in a matrix configuration. Increasing the percentage of phosphor particles 202 participating in the light conversion process, without increasing the surface area exposed to light 204, may significantly increase the efficiency of the system allowing for conversion core 200 to be a smaller size.

In one embodiment, the arrangement, density, chemistry, composition and/or percentage of the phosphor particles 202 suspended in transmitting medium 201 leads to more phosphor particles 202 interacting with light 204 and participating in light conversion. In some embodiments, the density or percentage of phosphor particles 202 is defined by the amount of actual phosphor that is mixed into the PMMA solution, or another specified carrier medium. A combination of different chemistries or compositions of phosphor particles 202 may be used, each having their own percentage of overall solute in each-sublayer to achieve the desired result.

In one embodiment, the plurality of phosphor particles 202 includes two or more different percentages of phosphor particles 202 length L of conversion core 200. The percentages of phosphor particles 202 may be the actual mixed-in percentage of phosphor particles 202 within PMMA (or another specified carrier medium) at a spot along the light-path of light 204 from the light source. The percentages of phosphor particles 202 within PMMA, or another specified carrier medium, may be changed and varied based on desired output. In one embodiment, the two or more different percentages of phosphor particles 202 across length L of conversion core 200 varies from approximately 0% to approximately 100%. For example, the two or more different percentages of phosphor particles 202 across length L of conversion core 200 may vary by 0%, 5%, 10%, 20%, 25%, 30%, 40%, 50%, 60%, 70%, 75%, 80%, 90%, or 100%. In another embodiment, the two or more percentages of phosphor particles 202 across length L of conversion core 200 varies from approximately 0.1% to approximately 25%. However, the two or more percentages of phosphor particles 202 across length L of conversion core 200 may vary from approximately 0.01% to approximately 25%, approximately 5% to approximately 95%, approximately 10% to approximately 75%, or approximately 15% to approximately 50%. The two or more percentages of phosphor particles 202 may be configured to continuously broaden absorption of light 204 from the light source. The different percentages of phosphor particles 202 do not have to be distributed in an aligned concentration, such as, but not limited to, low to high, high to low, etc. For example, the percentage of phosphor particles 202 may be approximately 5% at proximal end 228 and may be 15% at distal end 226. However, the percentage of phosphor particles 202 may be between approximately 0% and approximately 100%, approximately 5% and approximately 90%, approximately 15% and approximately 80%, approximately 25% and approximately 70%, or approximately 35% and 60% at proximal end 228, and between approximately 0% and approximately 100%, approximately 5% and approximately 90%, approximately 15% and approximately 80%, approximately 25% and approximately 70%, or approximately 35% and 60% at distal end 226.

In some embodiments, the plurality of phosphor particles 202 is disposed within transmitting medium 201 of conversion core 200. Transmitting medium 201 may be comprised of a transparent or translucent material configured to allow specified visible wavelengths of light to pass unimpeded through transmitting medium 201. Transmitting medium 201 may be comprised of polypropylene, glass, acrylic, ceramics, polycarbonate or any other transparent material. For example, transmitting medium 201 may be comprised of a transparent multi-layered ceramic material. The properties of the transparent multi-layered ceramic material may be varied to change the color of converted light 206. For example, the thickness of the layers of the transparent multi-layered ceramic material may be tailored to produce white light. In some embodiments, the transparent multi-layered ceramic material of transmitting medium 201 contains AlON, $Al_2O_3$, $Dy_2O_3$, $PR^{3+}$, $ND^{3+}$, $CR^{4+}$, $YB^{3+}$, $Dy^{3+}$, $Gd^{3+}$, and/or $Ce^{3+}$, which may be varied to tailor the properties of converted light 206.

Transmitting medium 201 may be a material into which phosphor particles 202 are able to be blended at varying temperatures. Transmitting medium 201 may be configured to modify optical properties of light 204 from the light source including diffusion, absorption, and/or redirecting specific wavelengths of light. Transmitting medium 201 may be comprised of a multilayered or blended material. In one embodiment, the thickness of an individual layer of the multiple layers of transmitting medium 201 ranges from approximately 30 microns to approximately 30 microns less than length L of conversion core 200. In another embodiment, the thickness of an individual layer of the multiple layers of transmitting medium ranges from approximately from 0.01 mm to approximately 25 mm. The transmission mechanism of light 204 through transmitting medium 201 may be, direct, on or off axis, scattered, and/or specular. Light 204 may be modified in a few different ways including color, brightness, average wavelength, peak wavelength, etc. For example, various optical elements may be used to modify light 204. In some embodiment, a lens is used to modify the properties of light 204. In some embodiments, a lens is not used within light conversion system 20.

Figure 3:
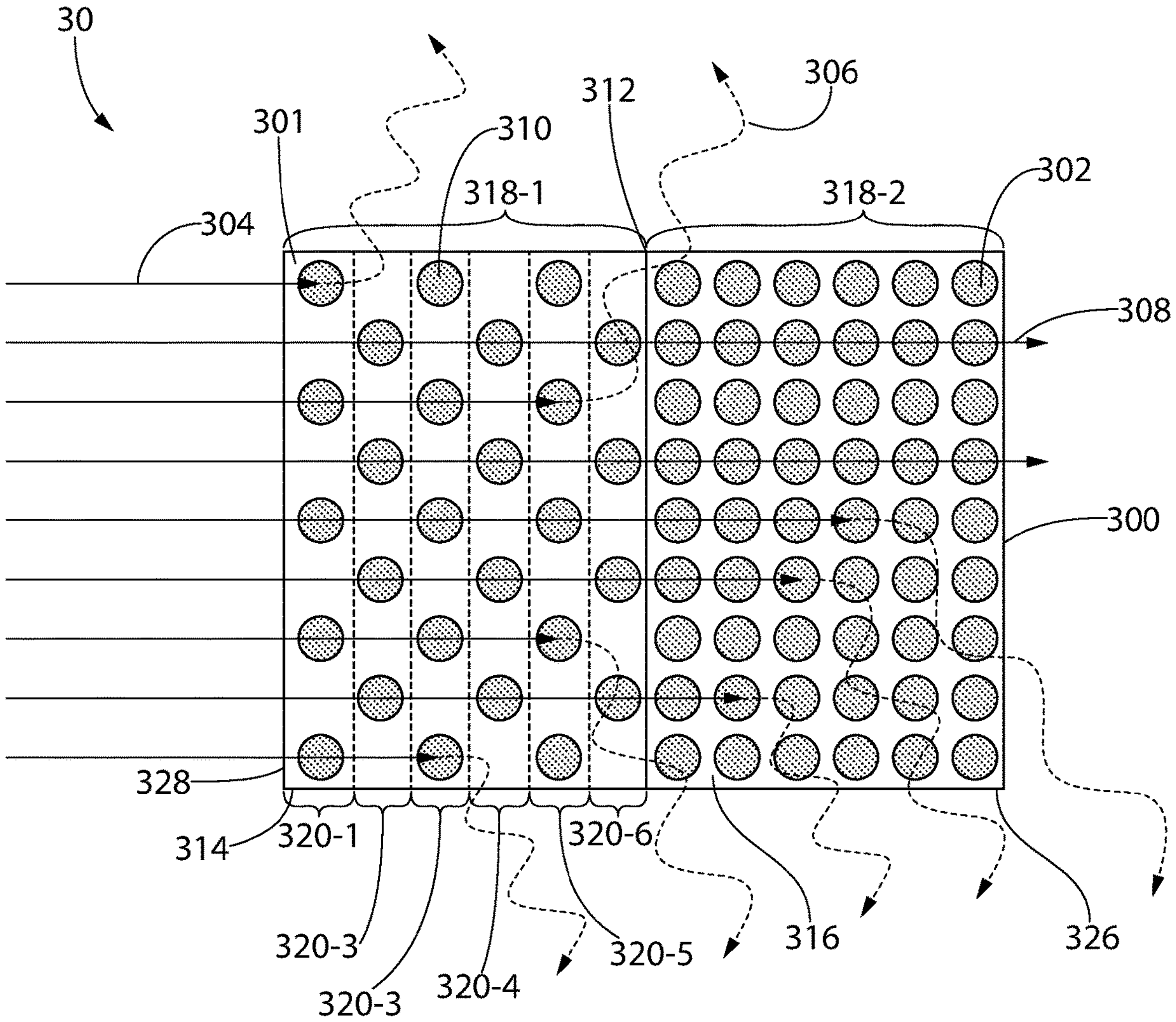
FIG. 3 is a schematic diagram of a light source converter, having a volumetric phosphor conversion core and a discontinuous density gradient in accordance with an exemplary embodiment of the present invention.

Referring to FIG. 3, there is shown a second exemplary embodiment. In some embodiments, light conversion system 30 relates to light conversion system 20. Light conversion system 30 may include a non-homogeneous conversion core 300 having distal end 326, proximal end 328, transmitting medium 301 and phosphor particles 302 and 310. Conversion core 300 may include left-side core 314 with a distribution of a plurality of phosphor particles 310, right-side core 316 with a distribution of a plurality of phosphor particles 302, and layer interface 312. Left-side core 314 and right-side core 316 may be optically coupled to a light source emitting light 304. Layer interface 312 may be disposed between left-side core 314 and right-side core 316.

Transmitting medium 301 of light conversion system 30 may be comprised of layers, which may be further comprised of individual sublayers. For example, as shown in FIG. 3, light conversion system 30 may be comprised of layer 318-1 and layer 318-2. Layer 318-N may refer to any one of the layers depicted (e.g., layer 318-1, layer 318-2, etc.). Layer 318-1 may be further comprised of individual sublayers, sublayer 320-N. Sublayer 320-N may refer to any of the individual sublayers depicted (e.g., sublayer 320-1, sublayer 320-2, sublayer 320-3, sublayer 320-4, sublayer 320-5 and/or sublayer 320-6). Similarly, layer 318-2 may also be comprised of individual sublayers (not shown). In one embodiment, layer 318-1 and layer 318-2 may each be comprised of six individual sublayers. The thickness of individual sublayers 320-N may be the diameter of, for example, one phosphor particle. As such, the thickness of layer 318-N may be defined by the thickness of individual sublayers 320-N. For example, the thickness of layer 318-N may be the sum of the thicknesses of all sublayers 320-N. As described previously, having similar density and composition of phosphor particles 310 in the sublayers 320-N within layer 318-1 may allow for specific control of the arrangement of phosphor particles 310 within the respective layers 318-N and transmitting medium 301. The specific arrangement of phosphor particles 310 may be applicable to FIG. 2B, FIGS. 4-7 and FIGS. 14A-14C as well.

In one embodiment, light 304 may enter transmitting medium 301 of conversion core 300 via left-side core 314. Light 304 may interact with phosphor particles 310, 302 resulting in converted light 306 being emitted from conversion core 300. The distribution of phosphor particles 302 volumetrically suspended on right-side core 316 may be intentionally arranged in a sequence of sublayers. The sequence of sublayers may be intentionally arranged in thicker layers or groups of layers configured to continuously broaden the absorption of light 304. As compared with FIGS. 1 and 2, FIG. 3 may show an increased level of light conversion depicted by converted light 306 being emitted from conversion core 300 and a decrease in the depiction of unconverted light 308 being emitted from distal end 326 of transmitting medium 301. The reduction in the amount of unconverted light 308 compared to FIG. 1 may be due to the forming of a gradient phosphor core and/or the non-continuous gradient increase in the density of phosphor particles 310, 302.

In one embodiment, the distribution of phosphor particles 302, 310 volumetrically suspended in left-side core 314 and right-side core 316 is non-homogeneous. For example, a smaller percentage of phosphor particles 310 may be volumetrically suspended in left-side core 314 as compared to a larger percentage of phosphor particles 302 that may be volumetrically suspended in right-side core 316. In some embodiments, conversion core 300 includes a non-continuous gradient increase in the density of phosphor particles 310 from left-side core 314 to the density of phosphor particles 302 from the right-side core 316. Further, there may be a rapid increase in the density of phosphor particles 302, 310 at or adjacent to layer interface 312.

In some embodiments, the volumetric suspension of phosphor particles 302, 310 forms a gradient in transmitting medium 301 of conversion core 300. In one embodiment, the volumetric suspension of phosphor particles 302, 310 leads to more phosphor particles 302, 310 interacting with incident light 304 and participating in light conversion. Increasing the percentage of phosphor particles 302, 310 participating in the light conversion process, without increasing the surface area exposed to incident light 304 and also without the need for specialized optics, may significantly increase the efficiency of light conversion system 30 while allowing for a comparatively smaller overall size. In one embodiment, the arrangement, density, chemistry, composition and/or percentage of phosphor particles 302, 310 suspended in transmitting medium 301 leads to more phosphor particles 302, 310 interacting with light 304 and participating in light conversion.

Figure 4:
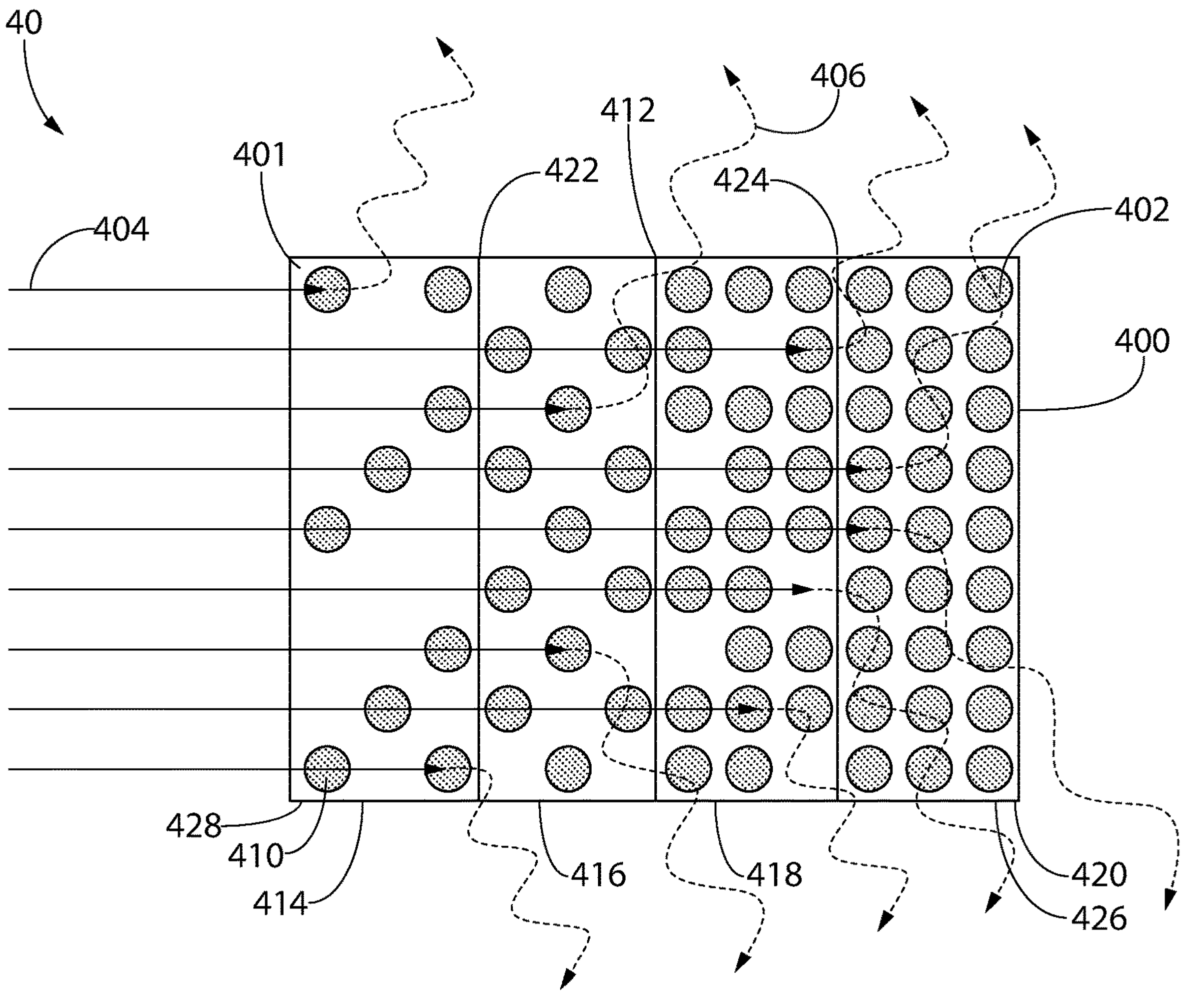
FIG. 4 is a schematic diagram of a light source converter, having a volumetric phosphor conversion core and a discontinuous density gradient in accordance with an exemplary embodiment of the present invention.

Referring to FIG. 4, there is shown a third exemplary embodiment of the present invention. In some embodiments, light conversion system 40 relates to light conversion systems 20, 30. Light conversion system 40 may include volumetric non-homogeneous conversion core 400 having distal end 426, proximal end 428, transmitting medium 401 and phosphor particles 402, 410. Conversion core 400 may be comprised of left-side core 414, left-middle core 416, right-middle core 418, right-side core 420 and layer interfaces 422, 412 and 424. Layer interface 422 may be disposed between left-side core 414 and left-middle core 416. Layer interface 412 may be disposed between left-middle core 416 and right-middle core 418. Layer interface 424 may be disposed between right-middle core 418 and right-side core 420.

Each of left-side core 414, left-middle core 416, right-middle core 418, and right-side core 420 of conversion core 400 may be distinguished by a certain density, composition, percentage and/or chemistry of phosphor particles 402, 410. Left-side core 414 may have a unique and intentional distribution of a plurality of phosphor particles 410 and right-side core 420 may have unique and intentional distribution of a plurality of phosphor particles 402. In some embodiments, the distribution of the plurality of phosphor particles 402 is different than the distribution of plurality of phosphor particles 410. In another embodiment, the distribution of the plurality of phosphor particles 402 is the same as the distribution of plurality of phosphor particles 410.

Transmitting medium 401 may be optically coupled to a light source emitting light 404. Light 404 may enter transmitting medium 401 of conversion core 400 from left-side core 414. In one embodiment, light 404 may interact with phosphor particles 410, 402 throughout conversion core 400 resulting in light 404 being converted to converted light 406, which is emitted from conversion core 400. The distribution of phosphor particles 410, 402 may be intentionally arranged in a sequence of sublayers in transmitting medium 401. The sequence of sublayers may be intentionally arranged in thicker layers or groups of layers configured to continuously broaden the absorption of light 404 from the light source. As compared with FIGS. 1 and 2B, FIG. 4 depicts an increased level of light conversion. For example, FIG. 4 depicts an increased amount of converted light 406 and no depiction of unconverted light being emitted from distal end 426 of conversion core 400. This may be due to, for example, the forming of a gradient phosphor core and/or the discontinuous gradient increase in the density of phosphor particles 402, 410.

The distribution of phosphor particles 402, 410 volumetrically suspended in transmitting medium 401 of conversion core 400 may be non-homogeneous as shown from the smaller percentage of phosphor particles 410 in left-side core 414 compared to the larger percentage of phosphor particles 402 in right-side core 420. There may be a non-continuous gradient increase in the density of phosphor particles 410 from left-side core 414 through left-middle core 416, through the right-middle core 418, to right-side core 420. Further, there may also be a rapid increase in the density of phosphor particles 402, 410 at or adjacent to layer interfaces 422, 412 and 424.

Figure 5:
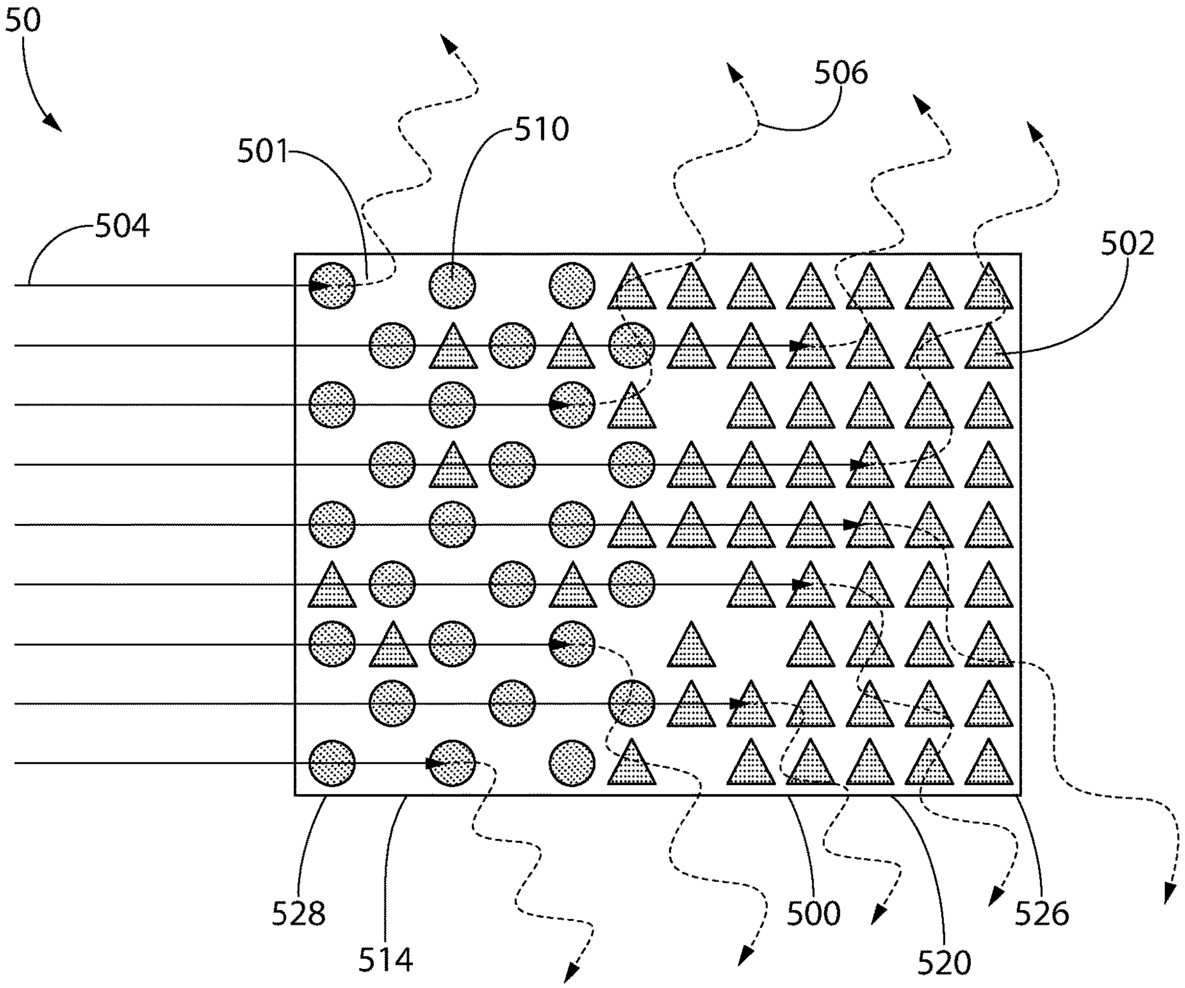
FIG. 5 is a schematic diagram of a light source converter, having a volumetric phosphor conversion core and a continuous density gradient, having two different phosphor types in accordance with an exemplary embodiment of the present invention.

Referring to FIG. 5, there is shown a fourth exemplary embodiment of the present invention. In some embodiments, light conversion system 50 relates to light conversion systems 20, 30, 40. Light conversion system 50 may include volumetric non-homogeneous conversion core 500 having distal end 526, proximal end 528, transmitting medium 501 and phosphor particles 502, 510. Phosphor particles 502, 510 may be volumetrically disposed within transmitting medium 501 and may have a distribution of a plurality of phosphor particles of a first type 510 and a distribution of a plurality of phosphor particles of a second type 502 throughout transmitting medium 501. Conversion core 500 may be optically coupled to a light source emitting light 504 and may include left-side core 514 and right-side core 520. Light 504 may enter transmitting medium 501 of conversion core 500 from left-side core 514. In one embodiment, light 504 interacts with phosphor particles 502, 510 resulting in light 504 being converted to converted light 506 and emitted from conversion core 500.

The distribution of phosphor particles 502, 510 may be intentionally arranged in a sequence of sublayers in transmitting medium 501. The sequence of sublayers may be intentionally arranged in thicker layers or groups of layers configured to continuously broaden the absorption of light 504. As compared with FIGS. 1 and 2B, FIG. 5 may show an increased level of light conversion depicted by converted light 506 being emitted from the conversion core 500 and may also show no depiction of light being emitted from distal end 526 of conversion core 500. This may be due to, for example, the use of two different type of phosphor particles 502, 510, the forming of a gradient phosphor core and/or the continuous gradient increase in the density of phosphor particles 502, 510.

The distribution of phosphor particles 502, 510 volumetrically suspended in conversion core 500 may be non-homogeneous as shown from the smaller percentage of phosphor particles of the first type 510 volumetrically suspended in left-side core 514 of conversion core 500 as compared to the larger percentage of phosphor particles of the second type 502 volumetrically suspended in right-side core 520 of conversion core 500. There may be a continuous gradient increase in the density of phosphor particles of the first type 510 adjacent proximal end 528 to the density of phosphor particles of the second type 502 adjacent to distal end 526.

The volumetric suspension of phosphor particles 502, 510 may form a gradient phosphor core in conversion core 500. In one embodiment, the volumetric suspension of phosphor particles 502, 510 may lead to more phosphor particles interacting with light 504 and participating in light conversion. Increasing the percentage of phosphor particles 502, 510 participating in the light conversion process, without increasing the surface area exposed to light 504, may significantly increase the efficiency of light conversion system 50 while allowing for a comparatively smaller overall size for the light source for the subsequent light output. In one embodiment, the arrangement, density, chemistry, composition and/or percentage of phosphor particles 502, 510 suspended in transmitting medium 501 of conversion core 500 may lead to more phosphor particles 502, 510 interacting with light 504 and participating in light conversion.

Figure 6:
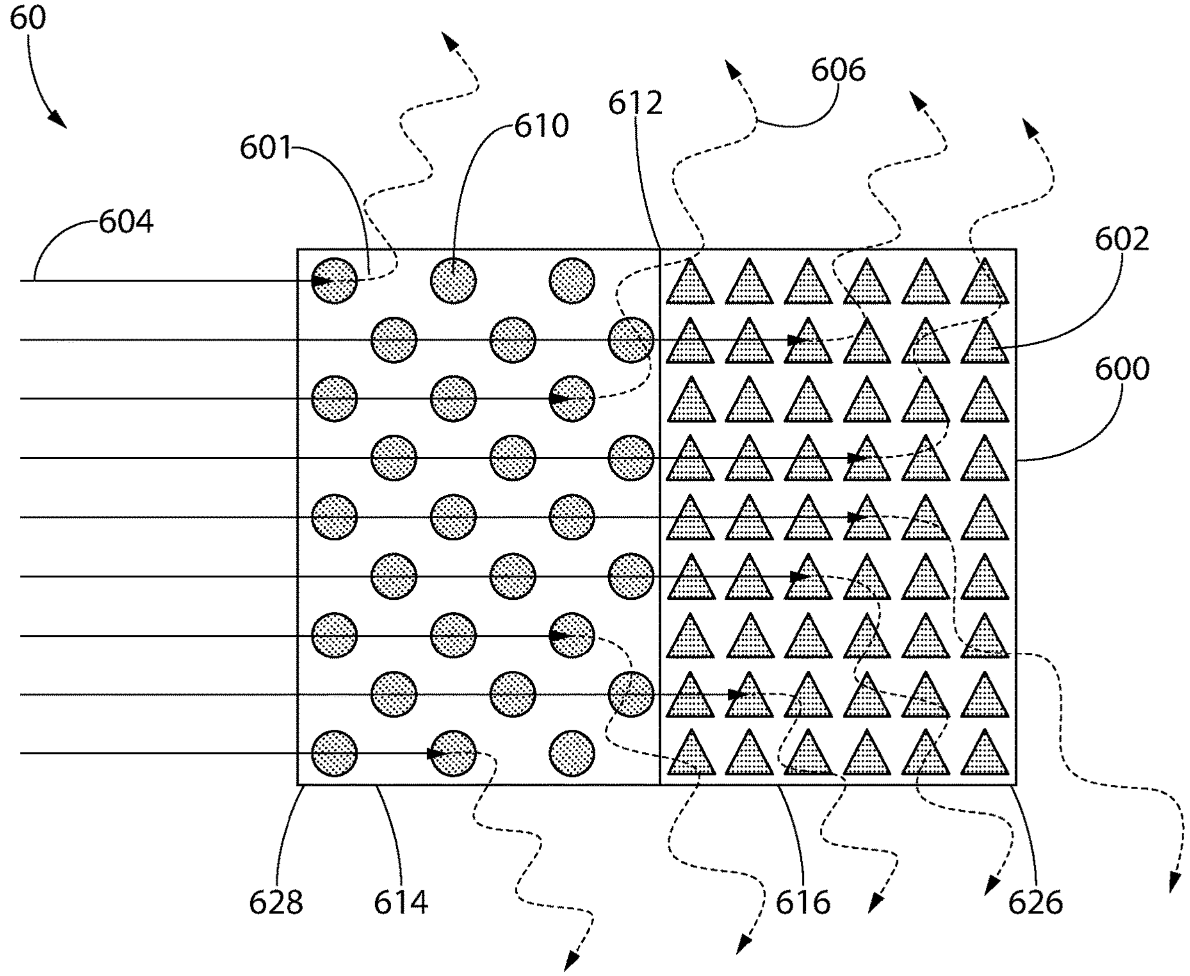
FIG. 6 is a schematic diagram of a light source converter, having a volumetric phosphor conversion core and a discontinuous density gradient, having two different phosphor types in accordance with an exemplary embodiment of the present invention.

Referring to FIG. 6, there is shown a fifth exemplary embodiment of the present invention. In some embodiments, light conversion system 60 relates to light conversion systems 20, 30, 40, 50. Light conversion system 60 may include non-homogeneous conversion core 600 having proximal end 262, proximal end 628, transmitting medium 601, and phosphor particles 602, 610. Conversion core 600 may include left-side core 614, right-side core 616, layer interface 612, a distribution of a plurality of phosphor particles of a first type 610 distributed in left-side core 614, and a distribution of a plurality of phosphor particles of a second type 602 distributed in right-side core 616. Conversion core 600 may be optically coupled to a light source emitting a light 604. Light 604 may enter transmitting medium 601 of conversion core 600 from left-side core 614. In one embodiment, light 604 may interact with phosphor particles 602, 610 resulting in converted light 606 being emitted from conversion core 600.

The distribution of phosphor particles 602, 610 may be intentionally arranged in sequence of sublayers in transmitting medium 601. The sequence of sublayers may be intentionally arranged in thicker layers or groups layers configured to continuously broaden the absorption of light 604. As compared with FIGS. 1 and 2B, FIG. 6 may show an increased level of light conversion depicted by converted light 606 being emitted from conversion core 600 and no depiction of light being emitted from distal end 626 of conversion core 600. This may be due to, for example, the use of two different type of phosphor particles 602, 610, the forming of a gradient phosphor core and/or the non-continuous gradient increase in the density of phosphor particles 602, 610.

The distribution of phosphor particles 602, 610 volumetrically suspended in conversion core 600 may be non-homogeneous as shown from the smaller percentage of phosphor particles of the first type 610 volumetrically suspended in left-side core 614 of conversion core 600 as compared to the larger percentage of phosphor particles of the second type 602 volumetrically suspended in right-side core 616 of conversion core 600. There may be a non-continuous gradient increase in the density of phosphor particles of the first type 610 from proximal end 628 to the density of phosphor particles of the second type 602 adjacent distal end 626. Further, there may also be a rapid increase in the density of phosphor particles 602, 610 at layer interface 612.

Figure 7:
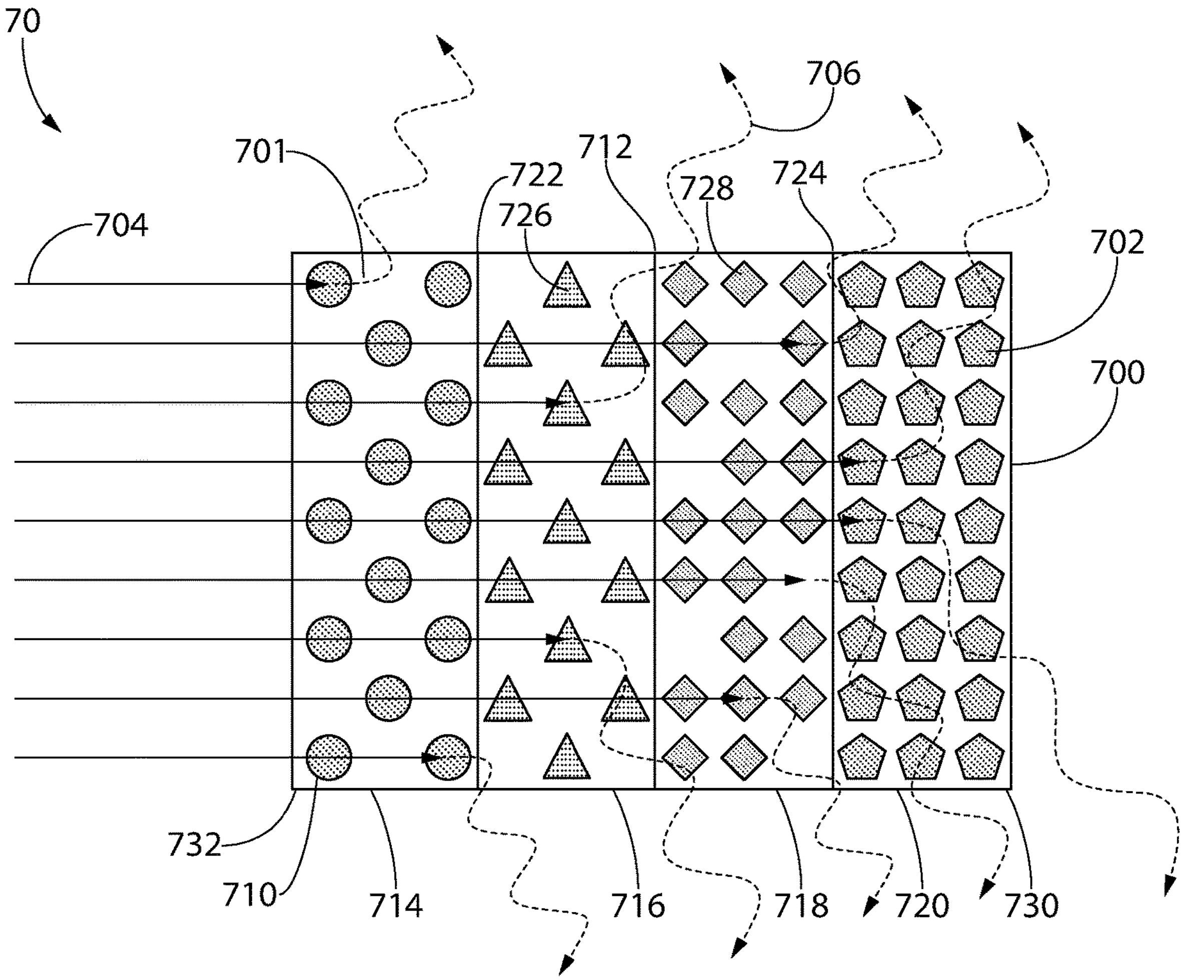
FIG. 7 is a schematic diagram of a light source converter, with an intentional distribution of phosphor particles as a sequence of layers in a transmitting medium, having the density of the particles increase in a discontinuous gradient from the left to right of the transmitting medium (and type of phosphor also changes from the left to right of the transmitting medium in four stages) and a non-homogeneous gradient volumetric phosphor conversion core, in accordance with an exemplary embodiment of the present invention.

Referring to FIG. 7, there is shown a sixth exemplary embodiment of the present invention. In some embodiments, light conversion system 70 relates to light conversion systems 20, 30, 40, 50, 60. Light conversion system 70 may include non-homogeneous conversion core 700 having proximal end 732, distal end 730, transmitting medium 701, and phosphor particles 702, 710, 728, 726. Conversion core 700 may include left-side core 714 with phosphor particles of a first type 710, left-middle core 716 with phosphor particles of a second type 726, right-middle core 718 with phosphor particles of a third type 728, right-side core 720 with phosphor particles of a fourth type 702, and layer interfaces 722, 712 and 724. Layer interface 722 may be disposed between left-side core 714 and left-middle core 716. Layer interface 712 may be disposed between left-middle core 716 and right-middle core 718. Layer interface 724 may be disposed between right-middle core 718 and right-side core 720.

Each of left-side core 714, left-middle core 716, right-middle core 718, and right-side core 720 of conversion core 700 may be distinguished by a certain density, composition, percentage and/or chemistry. Conversion core 700 may be optically coupled to a light source emitting light 704. Light 704 may enter transmitting medium 701 of conversion core 700 from left-side core 714. In one embodiment, light 704 may interact with phosphor particles 702, 726, 728, 710 resulting in converted light 706 being emitted. The distribution of phosphor particles 702, 726, 728, 710 may be intentionally arranged in sequence of sublayers in transmitting medium 701. The sequence of sublayers may be intentionally arranged in thicker layers or groups of layers configured to continuously broaden the absorption of light 704. As compared with FIGS. 1 and 2B, FIG. 7 may show an increased level of light conversion depicted by converted light 706 being emitted from conversion core 700 and no depiction of non-converted light being emitted from distal end 730 of conversion core 700. This may be due to, for example, the use of four different type of phosphor particles 702, 710, 726, 728, forming of a gradient phosphor core and/or the continuous gradient increase in the density of phosphor particles 702, 710, 726, 728.

The distribution of phosphor particles 702, 710, 726, 728, volumetrically suspended in transmitting medium 701 of conversion core 700 may be non-homogeneous as shown from the smaller percentage of phosphor particles of the first type 710 volumetrically suspended in left-side core 714 of conversion core 700 as compared to the larger percentage of phosphor particles of the fourth type 702 volumetrically suspended in right-side core 720 of conversion core 700. There may be a non-continuous gradient increase in the density of phosphor particles of the first type 710 from left-side core 714 through left-middle core 716 with phosphor particles of the second type 726, through right-middle core 718 with phosphor particles of the third type 728, through to the density of phosphor particles of the fourth type 702 adjacent right-side core 720. There may also be a sharp increase of phosphor particles 702, 710, 726, 728 at a layer interfaces 712, 722, and 724.

Figure 8:
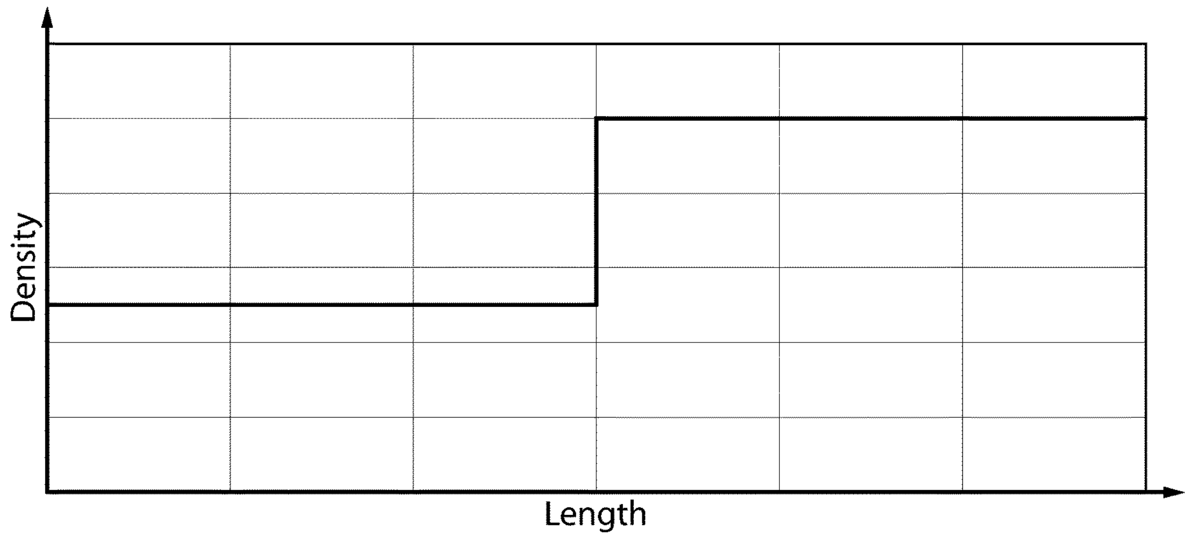
FIG. 8 is a graph illustrating density of phosphor particles distributed throughout the transmitting medium along the y-axis and length of the volumetric phosphor conversion core along the x-axis, in accordance with an exemplary embodiment of the present invention.

Referring to FIG. 8, there is shown a graph illustrating the relationship between the density of phosphor particles distributed throughout the transmitting medium and the length of the volumetric phosphor conversion core. The density may increase in a single discontinuous non-linear gradient. This discontinuous increase may be shown by a step-wise graph.

Figure 9:
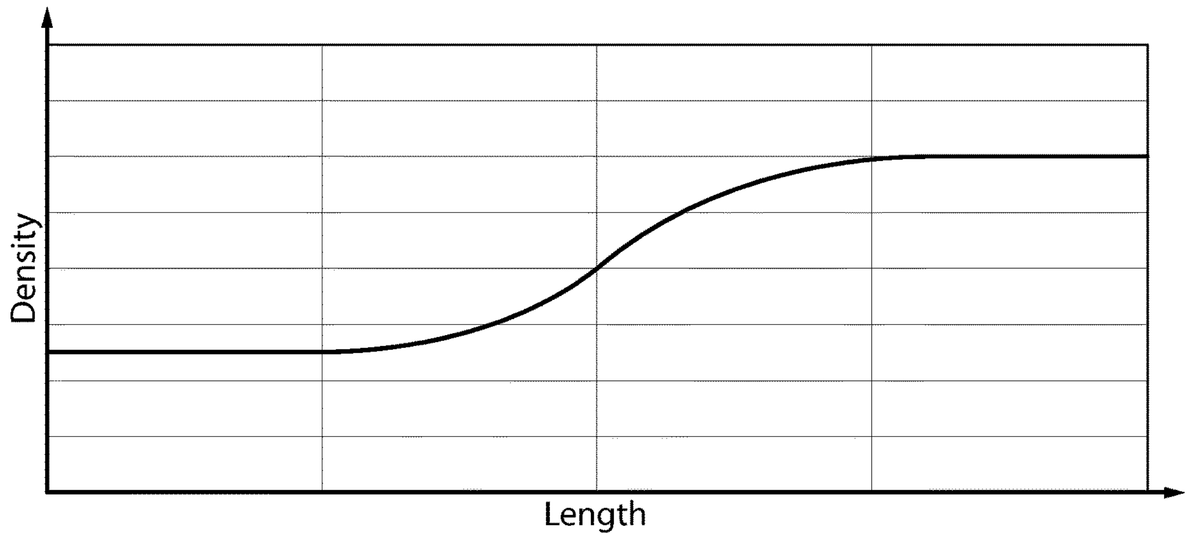
FIG. 9 is a graph illustrating density of phosphor particles distributed throughout the transmitting medium along the y-axis and the length of the volumetric phosphor conversion core along the x-axis, in accordance with an exemplary embodiment of the present invention.

Referring to FIG. 9, there is shown a graph illustrating the relationship between the density of phosphor particles distributed throughout the transmitting medium and the length of the volumetric phosphor conversion core, wherein the density may increase in a single continuous non-linear gradient.

Figure 10:
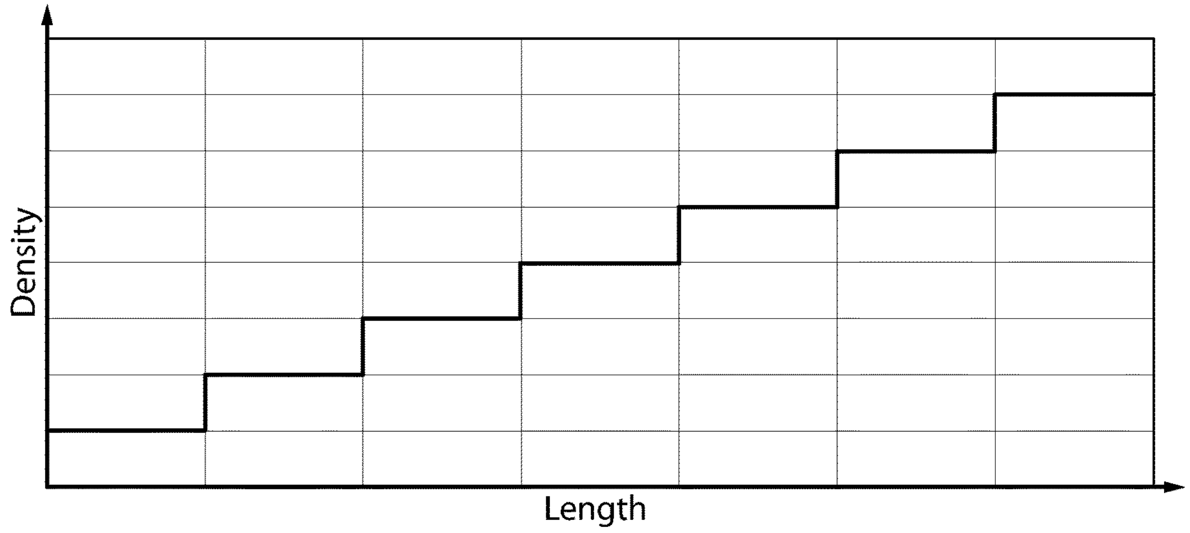
FIG. 10 is a graph illustrating density of phosphor particles distributed throughout the transmitting medium along the y-axis the length of the volumetric phosphor conversion core along the x-axis, in accordance with an exemplary embodiment of the present invention.

Referring to FIG. 10 there is shown a graph illustrating the relationship between the density of phosphor particles distributed throughout the transmitting medium and the length of the volumetric phosphor conversion core, wherein the density may increase in multiple discontinuous non-linear gradients. This discontinuous increase may be shown by a step-wise graph.

Figure 11:
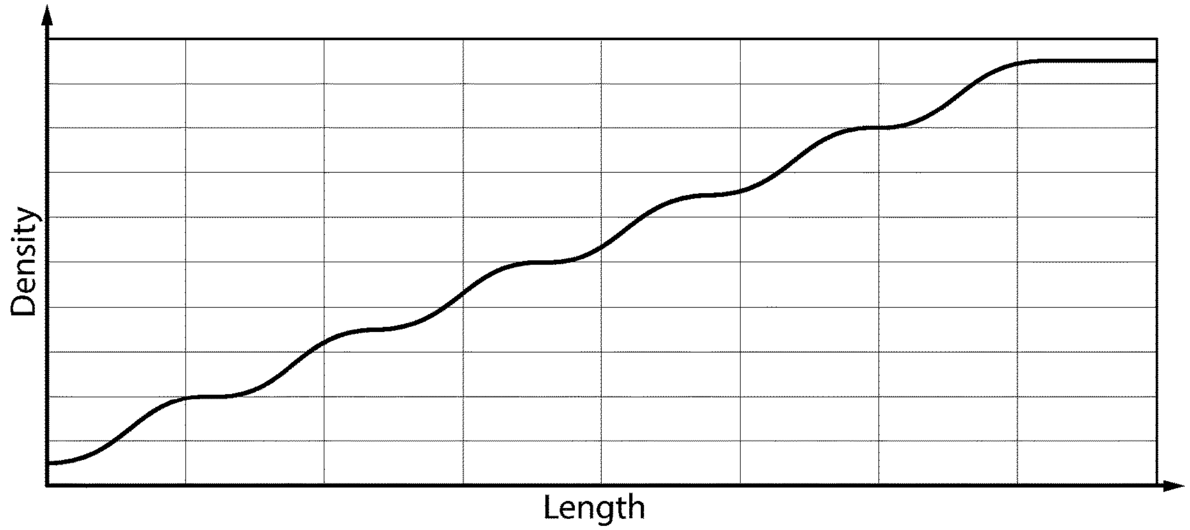
FIG. 11 is a graph illustrating density of phosphor particles distributed throughout the transmitting medium along the y-axis and the length of the volumetric phosphor conversion core along the x-axis, in accordance with an exemplary embodiment of the present invention.

Referring to FIG. 11 there is shown a graph illustrating the relationship between the density of phosphor particles distributed throughout the transmitting medium and the length of the volumetric phosphor conversion core, wherein the density may increase in multiple continuous non-linear gradients.

Figure 12:
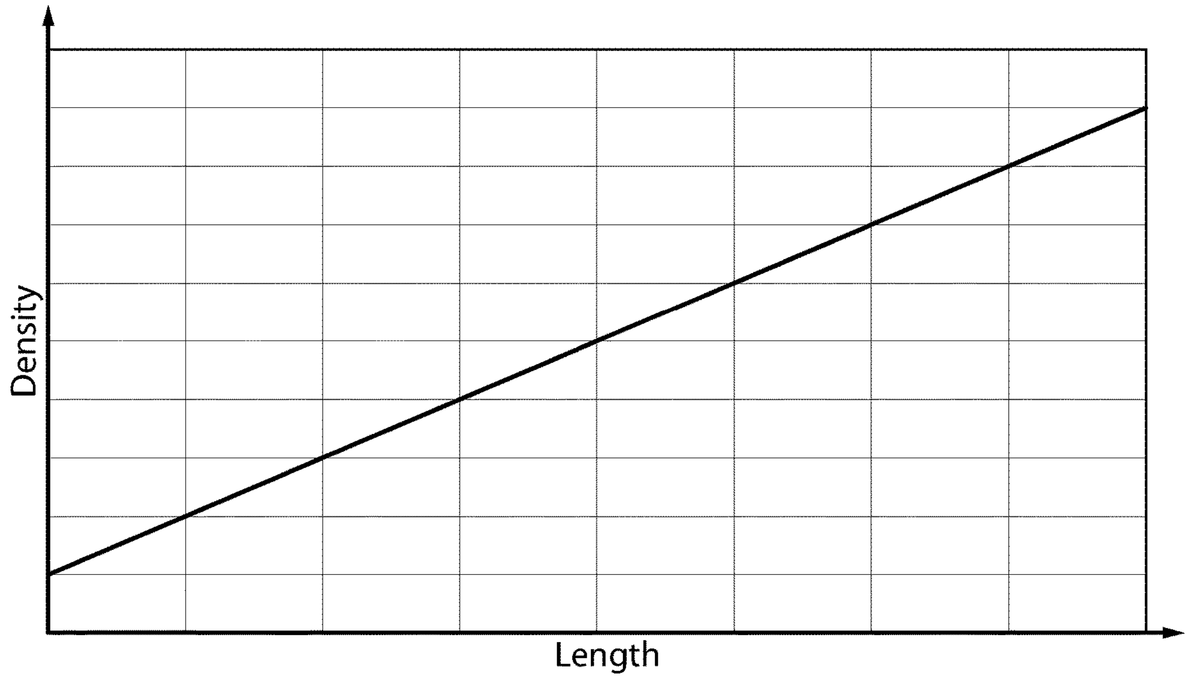
FIG. 12 is a graph illustrating density of phosphor particles distributed throughout the transmitting medium along the y-axis and length of the volumetric phosphor conversion core along the x-axis, in accordance with an exemplary embodiment of the present invention.

Referring to FIG. 12 there is shown a graph illustrating the relationship between the density of phosphor particles distributed throughout the transmitting medium and the length of the volumetric phosphor conversion core, wherein the density may increase in a single continuous linear gradient.

Figure 13:
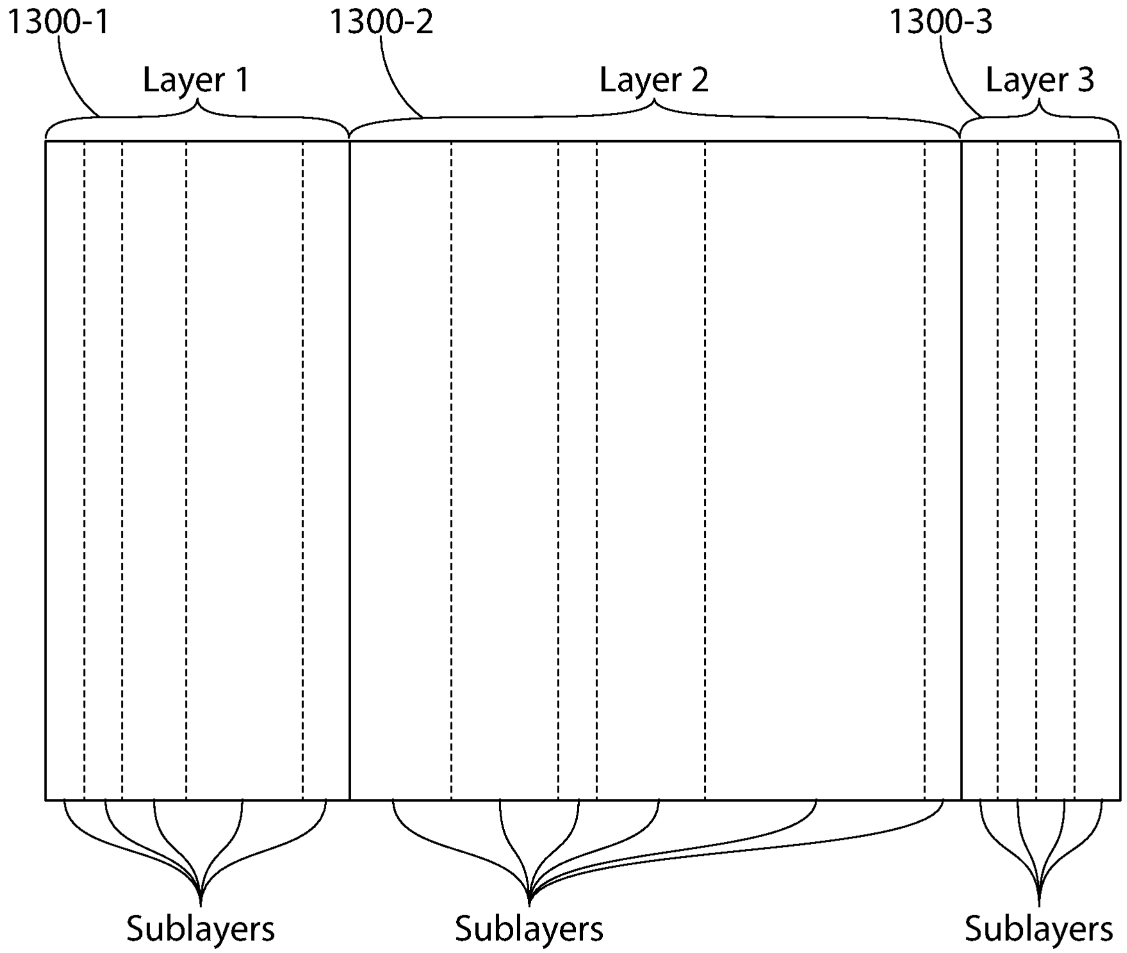
FIG. 13 is a schematic diagram of a light source converter, illustrating the arrangement of layers and sublayers.

Referring to FIG. 13, there is shown a schematic diagram of a light converter system, illustrating an exemplary arrangement of layers and sublayers. For example, Layer 1 1300-1 may be comprised of individual sublayers, Layer 2 1300-2 may be comprised of individual sublayers, and Layer 3 1300-3 may be comprised of individual sublayers. The individual sublayers of each layer 1300-1, 1300-2, 1300-3, may have similar or identical phosphor particle densities and compositions. At a minimum, the thickness of a sublayer may be the diameter of a single phosphor particle. However, the thickness of a sublayer may be the diameter of two phosphor particles, three phosphor particles, four phosphor particles, or more than four phosphor particles. The thickness of a sublayer is dependent on the light conversion and modulation properties required per use case. Each layer may be comprised of tens, hundreds, thousands, or millions of sublayers.

Figure 14A:
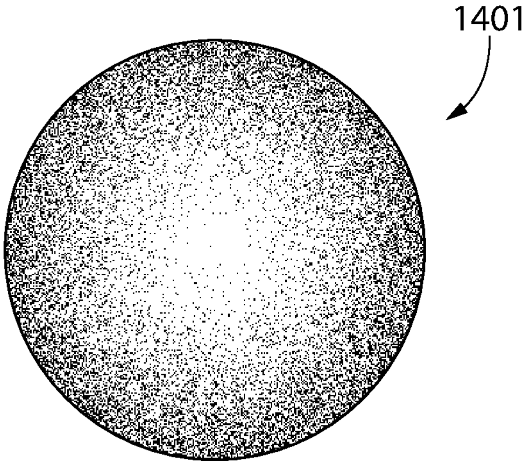
FIG. 14A is a schematic diagram of a light source converter, illustrating an exemplary radial arrangement of phosphor particle density within the volumetric phosphor conversion core.
Figure 14B:
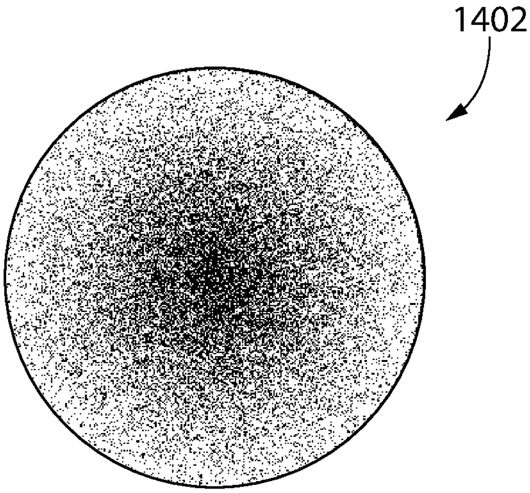
FIG. 14B is a schematic diagram of a light source converter, illustrating an exemplary radial arrangement of phosphor particle density within the volumetric phosphor conversion core.
Figure 14C:
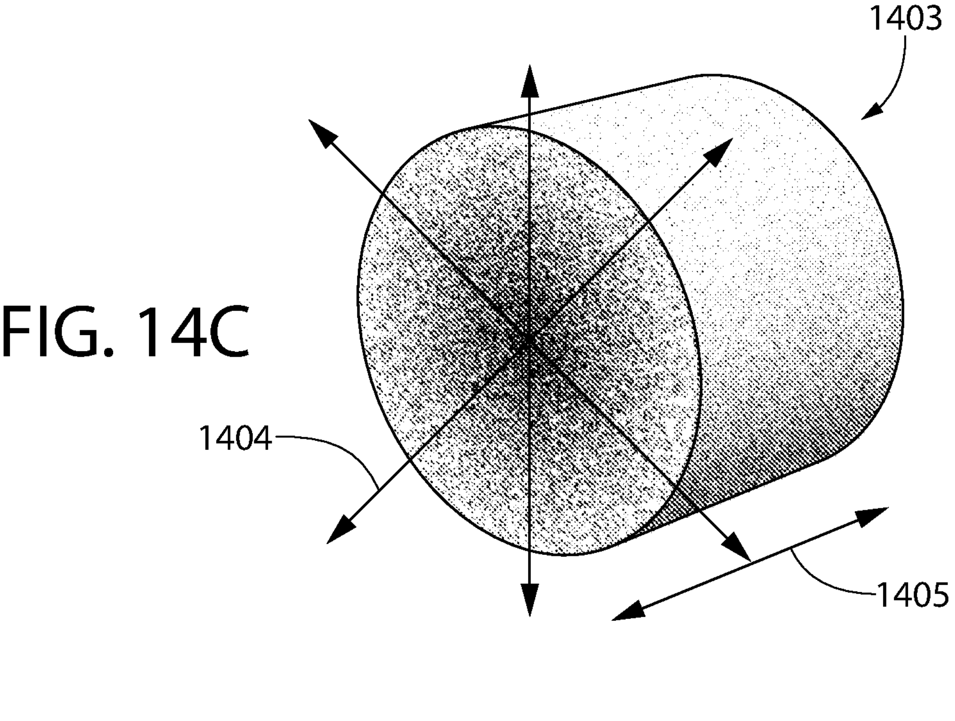
FIG. 14C is a schematic diagram of a light source converter, illustrating an exemplary radial arrangement of phosphor particle density within the volumetric phosphor conversion core.

Referring to FIGS. 14A-14C, there is shown a schematic diagram of a light converter system, illustrating an exemplary radial arrangement of phosphor particle density within the volumetric phosphor conversion core. In FIGS. 14A-14C, a higher phosphor particle density may be represented by a higher density of shading. For example, in one embodiment shown in FIG. 14A, the phosphor particle distribution may be arranged in such a way, such that individual layers may have gradient phosphor distribution 1401 wherein the density of the phosphor particles increases from the center radially outwardly. In another embodiment shown in FIG. 14B, individual layers may have gradient phosphor distribution 1402 wherein the density of the phosphor particles decreases from the center radially outwardly, or in any other arrangement that may be continuous or discontinuous with regards to the phosphor particle density change. In yet another embodiment shown in FIG. 14C, these aforementioned radial layers may be arranged in a volumetric shape such as cylinder 1403, wherein each radial layer may be different from the layers preceding and following it. The volumetric shaped described here is not limited to a cylinder, and radial layers can be used in volumetric shapes such as, but not limited to, prisms, cones, cubes, or any other solid geometry. The solid geometries that are built using these radial layers may have different densities in the radial 1404 and/or axial 1405 direction throughout.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A light source converter comprising:

a non-homogeneous conversion core optically coupled to a light source emitting a first spectrum of light, the conversion core having a transmitting medium comprised of a transparent or translucent material, or plurality of materials, and a plurality of layers and arranged to be perpendicular to a direction of the first spectrum of light, a proximal end, a distal end, and a length extending between the proximal end and the distal end; and a plurality of phosphor particles volumetrically suspended in each of the plurality of layers of the transmitting medium, each layer further arranged in a sequence of sublayers, each of the phosphor particles having a generally predetermined position in the sequence of sublayers and thicker layers or groups of layers, a first concentration of the plurality of phosphor particles in a first layer of the plurality of layers disposed proximate the proximal end of the conversion core differing from a second concentration of the plurality of phosphor particles in a second layer of the plurality of layers disposed proximate the distal end of the transmitting medium to form a gradient phosphor core, wherein the gradient phosphor core is configured to continuously broaden and emit a second spectrum of light along the length of the conversion core, the second spectrum of light being different than the first spectrum of light;

a package body having an internal cavity extending through the package body from a distal end of the package body to a proximal end of the package body, wherein the light source and the non-homogeneous conversion core are disposed within the internal cavity; and a window covering the distal end of the package body, the window configured to allow the second spectrum of light to be emitted from the light source converter at the distal end of the package body, wherein the package body includes a central axis extending from the proximal end to the distal end, and the light source, the non-homogeneous conversion core, and the window are optically coupled in series along the central axis.

2. The light source converter of claim 1, wherein the plurality of phosphor particles includes two or more phosphor particle percentages, compositions, sizes, and/or chemistries.

3. The light source converter of claim 2, wherein the two or more phosphor particle percentages across the length of the transmitting medium is from approximately 0% to approximately 100%.

4. The light source converter of claim 2, wherein the two or more phosphor particle percentages across the length of the transmitting medium is from approximately 0.1% to approximately 25%.

5. The light source converter of claim 1, wherein the plurality of phosphor particles includes two or more phosphor types.

6. The light source converter of claim 5, wherein one or more of a percentage, chemistry, size, and composition of the two or more phosphor particles is configured to continuously broaden an absorption band of light from the light source.

7. The light source converter of claim 1, wherein the volumetric suspension of the plurality of phosphor particles forms a gradient phosphor core.

8. The light source converter of claim 7, wherein the gradient phosphor core is a continuous or discontinuous gradient phosphor core.

9. The light source converter of claim 1, wherein a thickness of each of the plurality of layers is approximately 30 microns to approximately 30 microns less than the length of the transmitting medium.

10. The light source converter of claim 1, wherein an overall concentration of the plurality of phosphor particles increases or decreases from the proximal end to the distal end.

11. The light source converter of claim 1, wherein the transmitting medium is comprised of a semi-transparent material configured to allow certain visible wavelengths of light to pass unimpeded through the transmitting medium.

12. The light source converter of claim 1, wherein the transmitting medium is comprised of polypropylene, glass, acrylic, ceramics, polycarbonate, optical polymers, polyesters, polystyrenes, polyethylenes, polyurethanes, olefins, copolymers, gels, hydrogels, glassy, crystalline, and/or supercooled liquids.

13. The light source converter of claim 1, wherein the transmitting medium is comprised of polypropylene, glass, acrylic, ceramics, and/or polycarbonate.

14. The light source converter of claim 1, wherein the conversion core is configured to modify optical properties of light from the light source by diffusion, absorption, and/or redirecting specific wavelengths of light.

15. The light source converter of claim 1, wherein the plurality of phosphor particles are generally evenly spaced from one another across each cross section along the length of the conversion core, wherein each cross-section is taken normal to the length of the conversion core.

16. The light source converter of claim 1, wherein the light source is a laser.

17. The light source converter of claim 1, wherein each of the plurality of layers is comprised of multiple sublayers each having the same phosphor particle concentration and/or phosphor particle chemistry within a sublayer.

18. The light source converter of claim 1, wherein each of the plurality of layers has the same phosphor particle concentration and/or phosphor particle chemistry across a length of the each of the plurality of layers.

19. The light source converter of claim 1, wherein at least two layers of the plurality of layers differ in phosphor particle percentage, phosphor particle concentration, phosphor particle composition, phosphor particle size, and/or phosphor particle chemistry.

20. The light source converter of claim 1, wherein a thickness of each of the plurality of layers is approximately from 0.01 mm to approximately 25 mm.

21. The light source converter of claim 1, wherein the volumetric suspension of the plurality of phosphor particles is a discontinuous volumetric suspension including a non-linear, monotonic or polytonic suspension.

22. The light source converter of claim 1, wherein the proximal end receives the first spectrum of light and the distal end emits a second spectrum of light different than the first spectrum of light.

23. The light source converter of claim 1, wherein the plurality of layers form a volumetric shape and the volumetric shape is a cylinder, a prism, a cone, or a cube.

24. An optical device comprising:

a laser light source emitting a first spectrum of radiation;

an optical element located to receive the first spectrum of radiation from the laser light source and output conditioned radiation;

a non-homogeneous conversion core optically coupled to the optical element, the conversion core having a proximal end, a distal end, a length extending between the proximal end and the distal end, and a transmitting medium comprised of a transparent or translucent material, or plurality of materials, and a plurality of layers arranged to be perpendicular to a direction of the conditioned radiation;

a plurality of phosphor particles volumetrically suspended in each of the plurality of layers of the transmitting medium, each layer further arranged in a sequence of sublayers, each of the phosphor particles having a generally predetermined position in the sequence of sublayers and thicker layers or groups of layers, a first concentration of the plurality of phosphor particles in a first layer of the plurality of layers disposed proximate the proximal end of the conversion core differing from a second concentration of the plurality of phosphor particles in a second layer of the plurality of layers disposed proximate the distal end of the conversion core to form a gradient phosphor core, wherein the gradient phosphor core is configured to continuously broaden and emit a second spectrum of radiation from the optical element along the length of the conversion core;

a package body having an internal cavity extending through the package body from a distal end of the package body to a proximal end of the package body, wherein the laser light source, the optical element, and the non-homogeneous conversion core are disposed within the internal cavity; and a window covering the distal end of the package body, the window configured to allow the second spectrum of radiation to be emitted from the optical device at the distal end of the package body, wherein the package body includes a central axis extending from the proximal end to the distal end, and the laser light source, the optical element, the non-homogeneous conversion core, and the window are optically coupled in series along the central axis.

25. A light source converter comprising:

a non-homogeneous conversion core optically coupled to a light source emitting a first spectrum of light, the conversion core having a transmitting medium comprised of a plurality of layers and arranged to be perpendicular to a direction of the first spectrum of light, a proximal end, a distal end, and a length extending between the proximal end and the distal end; and a plurality of phosphor particles volumetrically suspended in each of the plurality of layers of the transmitting medium, a first concentration of the plurality of phosphor particles in a first layer of the plurality of layers disposed proximate the proximal end of the conversion core differing from a second concentration of the plurality of phosphor particles in a second layer of the plurality of layers disposed proximate the distal end of the transmitting medium, wherein at least the first layer and the second layer form a concentration gradient within the non-homogeneous conversion core, wherein each layer has a gradient phosphor distribution and a concentration of the plurality of phosphor particles decreases from a center of each layer radially outwardly.

* * * * *